Aug. 19, 1924.    1,505,679
H. W. THAYER
POWER LIFT FOR GROUNDWORKING IMPLEMENTS
Filed Feb. 16, 1922
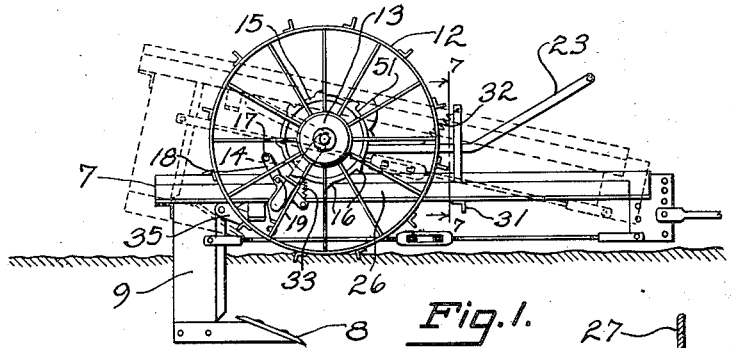
Fig. 1.
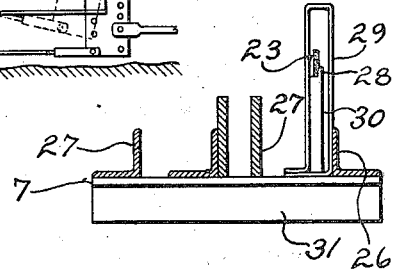
Fig. 7.
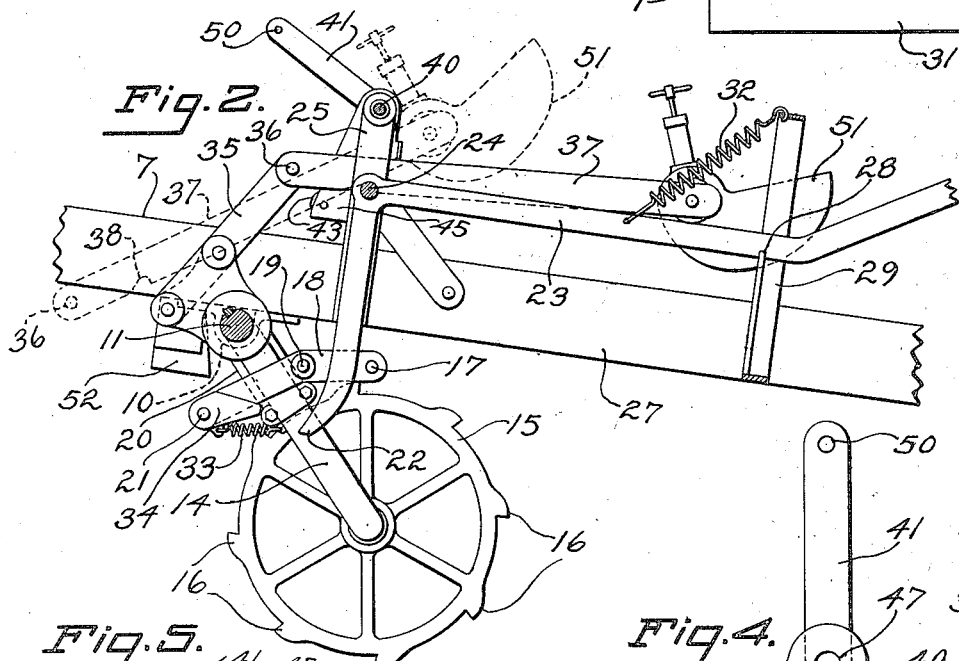
Fig. 2.
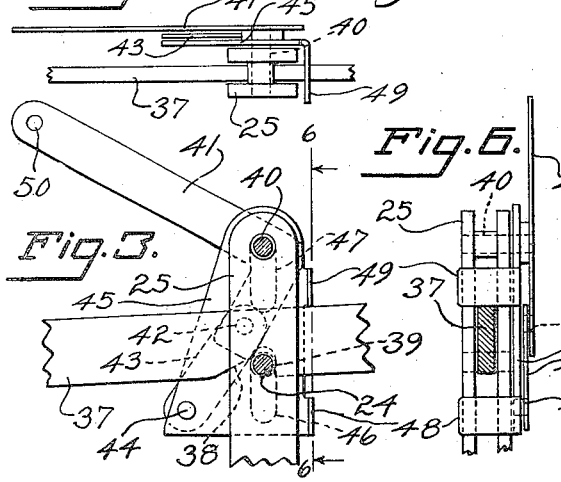
Fig. 5.
Fig. 3.
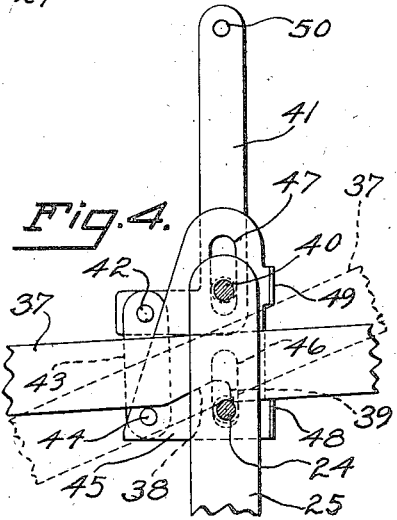
Fig. 6.
Fig. 4.
Inventor
HARRY W. THAYER
Lyon & Lyon
Attorneys Patented Aug. 19, 1924.

1,505,679

UNITED STATES PATENT OFFICE.

HARRY W. THAYER, OF LOS ANGELES, CALIFORNIA, ASSIGNOR TO THE KILLEFER MANUFACTURING COMPANY, OF LOS ANGELES, CALIFORNIA, A CORPORATION OF CALIFORNIA.

POWER LIFT FOR GROUNDWORKING IMPLEMENTS.

Application filed February 16, 1922. Serial No. 536,943.

*To all whom it may concern:*

Be it known that I, HARRY W. THAYER, a citizen of the United States, residing at Los Angeles, in the county of Los Angeles and State of California, have invented a new and useful Power Lift for Groundworking Implements, of which the following is a specification.

This invention relates to mechanism for raising and lowering ground-working tools such as plows, chisels and the like, the turning of the ground wheels generating power for lifting the plows or other tools out of the ground, when it is desired to discontinue the plowing or other operation effected by the tools.

This invention is an improvement on the copending application of D. M. Watters filed November 15th, 1920, Serial No. 424,083, and an object of the invention is to prevent accidental release of the link by jarring of the implement in operation.

The accompanying drawings illustrate the invention:

Fig. 1 is a side elevation of an implement embodying the invention, the frame and the parts carried thereby being shown in solid lines in position for plowing, and being shown in broken lines in elevated position.

Fig. 2 is an enlarged elevation, partly in section, of a fragment of the implement shown in Fig. 1, the frame and its parts being in raised position. Broken lines indicate the position of the link when the frame is in lowered position.

Fig. 3 is an enlarged detail of the latch mechanism showing the link latched in position to hold the frame in lifted position.

Fig. 4 is a detail similar to Fig. 3 excepting that the parts are shown in the link releasing position, broken lines indicating the position of the link corresponding to the position shown in broken lines in Fig. 2.

Fig. 5 is a plan view of Fig. 3.

Fig. 6 is an elevation, partly in section, from the line indicated by 6—6, Fig. 3.

Fig. 7 is an enlarged fragmental elevation, partly in section, from the line indicated by 7—7, Fig. 1.

A frame of any suitable construction is indicated at 7 and the ground-working tools are supported on the frame. The tools shown in this instance are sub-soil points 8 which are connected to the frame by standards 9. The frame is provided with bearings 10 in which is journaled a crank axle 11. The opposite ends of the axle 11 are supported on ground wheels 12. Only one of the points 8, standards 9, bearings 10 and ground wheels 12 can be seen because of the nature of the views. The hubs 13 of the ground wheels constitute fulcrums upon which the axle 11 turns, the crank arms of the axle being indicated at 14.

Mounted on the axle portions that are concentric with one of the hubs 13 is a toothed or ratchet wheel 15, this wheel together with the parts to be now described, are provided in duplicate, one set on each side of the implement. Inasmuch as both sets are alike, but one will be described herein and, though but one set could be used, it is preferred to employ the two sets. The wheel 15 is provided with teeth 16 and is suitably fastened to the hub 13. Any one of these teeth is adapted to be selectively engaged by a detent 17 provided on one end of a lever 18 which is fulcrumed at 19 on a clamp 20 mounted on the crank arm 14.

The opposite end of the lever 18 is connected with the complementary lever, not shown, on the opposite side of the implement by a cross member 21, which constitutes an abutment adapted, when the crank is in lowered position, to be engaged by the curved end 22 of a lever 23. Only one lever 23 and one each of the parts now to be described are provided. The lever 23 is pivotally mounted at 24 on a standard 25 supported on longitudinal bars 26, 27 of the frame 1. The forward portion of the lever 23 is adapted to rest upon a shoulder 28 of a standard 29 mounted on the bar 27. The standard 29 is provided with a vertical slot 30 to permit the lever to be lowered when it is disengaged from the shoulder 28. The standard 29 is mounted on a cross bar 31 of the frame. When the operator depresses the lever 23 and then releases it, it is raised to approximately the level of the shoulder 28 by a spring 32 which connects the lever to the upper end of the standard 29.

When the cranks 14 are in lowered position and the forward end of the lever 23 is depressed, the lower end 22 is moved rearwardly against the abutment 21, and further depression of said lever consequently swings the lever 18 on its pivot 19 to move its detent 17 into the path of rotation of the teeth 16.

When the wheels 12 are travelling over the ground the toothed wheels 15 of course rotate and, if the detent 17 be engaged by the toothed wheel 15, the lever 18 will be raised to the position shown in Figure 2. Since the lever 18 is pivotally connected with the crank arm 14 of the axle, this movement of said lever of course swings the crank arm upward and consequently hoists the rear end of the frame 1, together with whatever tools are mounted on or attached to the rear portion of said frame. The movement is sufficient to cause the tools to leave the earth.

The lever 18 is yieldingly held with its detent 17 out of engagement with the notched wheel 15 by a spring 33. There is a spring at each side of the implement and the elements now to be described are also provided in duplicate at opposite sides. The detent 17 is limited in its movement away from the path of rotation of the teeth 16 by a stop 34 formed on the lever 18 and adapted to engage the clamp 20, when the parts are in position to permit the frame to assume the lowered position shown in full lines in Figure 1.

When the lever 18 has been raised to the position shown in Figure 2, the abutment 21 engages an abutment 52 secured to the frame 1. When this occurs further forward movement of the lever 18 causes the abutment 52 to depress the member 21 relative to the detent 11 which, accordingly, is thereupon withdrawn from engagement with the tooth 16, thus placing the lever 18 in position for lowering as in Figure 2; though such lowering will not naturally occur until the operator wills it, since means are provided for preventing, until desired, the return of the axle to its former position as will be described hereinafter.

The crank of the axle is provided with a single fixed arm 35 which is pivoted at 36 to a link 37 that is notched at 38 to form a shoulder 39. The link 37 passes through the standard 25 and rests upon the pivot 24 and is given endwise motion relative to said pivot by turning of the axle, as hereinbefore described, so that when the lever 18 is in the position indicated in Fig. 2, the notch 38 will be in position to receive the pivot 24. At the time that the abutment 21 strikes the stop 52, or a moment before, the shoulder 39 has advanced sufficiently to drop in front of the stop 24. In consequence of this, as soon as the detent 17 is retracted from engagement with the toothed wheel 15, the shoulder 39 will engage the pivot 24 which thus constitutes a stop to hold the link 37 in the position shown in Figures 2 and 3, to thereby prevent the crank and rear end of the frame from lowering after disengagement of the detent 17 from the toothed wheel.

In the application hereinbefore mentioned, an abutment was provided on the lever 23 for engaging the link 37, upon upward movement of said lever, to release the link 37 from the stop 24 to permit the frame to lower. Accidental striking upwardly by the operator of the lever 23, or jolting of the implement over rough ground, would cause accidental release of the link 37 and, therefore, instead of employing such construction, I have provided different means for releasing the link and such means are the essence of the invention and will now be described. Pivoted at 40 to the upper end of the standard 25 is a bell-crank lever 41 to which is pivoted at 42 one end of a link 43. The other end of the link 43 is pivoted at 44 to the lower portion of a slide 45 which is shiftably mounted on the standard 25 by the stop 24 and pivot 40 that pass respectively through slots 46, 47 extending lengthwise of the slide 45.

The slide 45 is provided with a shoulder 48 adapted to engage the under face of the link 37 to displace said link from engagement with the stop 24 when the lever 41 is swung rearwardly to the position shown in Figure 4. When the lever 41 is in its forward position, as in Figure 3, another shoulder 49 on the slide 45 engages the upper face of the link 37, and in this position of the lever 41, as will be seen in Figure 3, the pivot 42 of the link 43 is positioned between the stop 24 and a line connecting the pivots 40 and 44 so that, when upward pressure upon the link 37 or vibration of the parts as the implement operates tends to disengage the link 37 from the stop 24, the link 43 will thrust against the stop 24, as in Fig. 3, and prevent raising of the slide 45. Thus the link 37 is latched in position for holding the frame lifted, and it requires the operator to swing the lever 41 from the position shown in Figure 3 to the position shown in Figure 4 in order to effect release and lifting of the link 37 to permit the frame to lower. A suitable operating line, not shown, may be connected with the upper end of the lever 41 to operate said lever, and for this purpose the lever 41 is perforated as indicated at 50.

When the frame is thus lowered by releasing action of the lever 41, the tools attached to the frame will enter the earth as the implement is moved forward. It is not necessary that the shoulder 28 be provided for supporting the lever 23 in its upper position, since the spring 32 will effect this, but it is preferable to provide said shoulder and depend upon the spring 24 only for returning the lever 23 to neutral position after said lever has been depressed to cause the detent 17 to engage the toothed wheel 15.

When the frame drops and pulls the link 37 rearwardly upon the stop 24, it will be clear that some provision must be made to limit the rearward movement of said link so as to restrict the depth to which the tools 8 will penetrate the earth, and there is provided for this purpose a stop 51 on the forward end of the link 37 adapted to engage the standard 25 when the frame drops. The stop 51 shown in the drawings is adjustable and may be of the construction fully described in the above mentioned copending application. The detailed construction of the stop 51 is not a part of the present invention and, therefore, it need not be further described herein.

I claim:

1. In an implement, the combination of a frame, a crank axle supporting the frame, ground wheels journaled on the axle, means to connect the crank at will to one of the wheels to turn the crank, a member to throw the connecting means into operation, means operating when the crank is turned to a predetermined position to throw the connecting means out of operation, means to hold the crank in the predetermined position, and means to release the crank-holding means to permit the crank to be turned in the reverse direction, said means including a shiftably mounted slide, a pivoted lever, and a link pivotally connected to the slide and to the lever, 2. In an implement, the combination of a frame, ground wheels, an operating member, means operating to raise the frame relative to the wheels when the operating member is in one position, means operated by raising of the frame to disconnect the frame raising means, means to hold the frame in the raised position when the frame-raising means is disconnected, said frame holding means including a stop and a link having a shoulder to engage the stop, a shiftably mounted slide having a shoulder to engage the link to release it from the stop and having a second shoulder to engage the link to hold the link with the shoulder against the stop, a pivoted lever, and a second link pivoted to the lever and to the slide, the pivot that connects the lever and second link being positioned between the stop and a line connecting the other pivots when the second shoulder is approximately in engagement with the first link.

3. In an implement, the combination of a frame, a crank axle supporting the frame, ground wheels supporting the axle, means to connect the axle at will to one of the wheels to turn said axle to raise the frame, a manually operated member to throw the connecting means into operation, means operating when the crank is turned to a predetermined position to throw the connecting means out of operation, means to hold the crank in the predetermined position, said means including a shiftably mounted member having a shoulder and a stationary shoulder to engage the first shoulder, and means engaging and holding said member toward the second shoulder and operable, at will, to release said member and move it out of engagement with the second shoulder.

Signed at Los Angeles, California this 3d day of February 1922.

HARRY W. THAYER.

Witnesses:
GEORGE H. HILES,
L. BELLE WEAVER.